United States Patent

Hollis

[15] 3,657,564

[45] Apr. 18, 1972

[54] CIRCUIT PROVIDING FAST PULSE RISE AND FALL TIMES

[72] Inventor: David L. Hollis, Raleigh, N.C.

[73] Assignee: Lockheed Aircraft Corporation, Burbank, Calif.

[22] Filed: Apr. 24, 1970

[21] Appl. No.: 31,768

Related U.S. Application Data

[63] Continuation-in-part of Ser. No. 636,099, May 4, 1967, abandoned.

[52] U.S. Cl. ............................307/252 K, 307/246, 328/67, 307/265

[51] Int. Cl. ..................................................H03k 17/72

[58] Field of Search ...................328/58, 67; 307/246, 252 K, 307/265

[56] References Cited

UNITED STATES PATENTS

| | | | |
|---|---|---|---|
| 3,417,266 | 12/1968 | Well | 307/246 |
| 2,575,559 | 11/1951 | Parkinson | 328/58 |
| 2,709,746 | 5/1955 | Page | 328/58 |
| 2,636,119 | 4/1953 | Forbes | 328/58 |
| 2,767,311 | 10/1956 | Meyer | 328/58 |

*Primary Examiner*—John S. Heyman
*Assistant Examiner*—Harold A. Dixon
*Attorney*—James A. Hinkle and George C. Sullivan

[57] ABSTRACT

A pulse circuit for generating a pulse of square waveform at substantial current levels utilizing a power source to charge a capacitor bank which is discharged through a load and a first silicon controlled rectifier in series with the load upon the gating on of the first silicon controlled rectifier. A second silicon controlled rectifier is connected to shunt both the load and first silicon controlled rectifier after the correct pulse width is obtained and after being gated on by a delay device whose time characteristics correspond to the desired pulse width.

6 Claims, 1 Drawing Figure

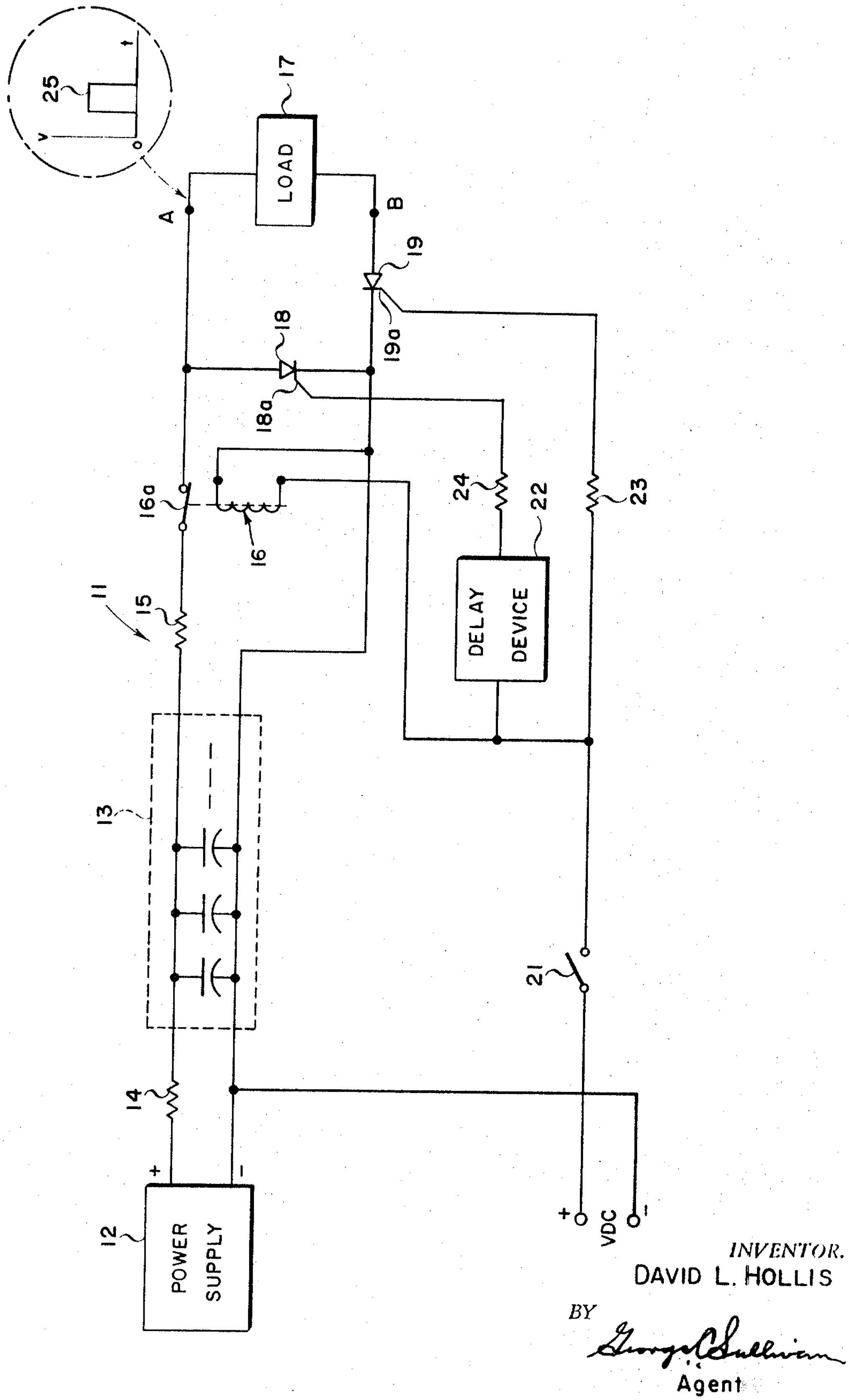
INVENTOR.
DAVID L. HOLLIS
BY
Agent

CIRCUIT PROVIDING FAST PULSE RISE AND FALL TIMES

This is a continuation-in-part of application Ser. No. 636,099, filed May 4, 1967, and now abandoned.

This invention relates in general to electronic transient generators and more particularly to transient generators which generate a high voltage, high current square wave pulse for testing electronic equipment for susceptibility to power line transients.

The aircraft industry in the past has desired to conduct certain tests of subjecting electronic equipment to high voltage, high current short duration transients, but there has been no previously available equipment that would adequately perform these tests. To carry out the aforementioned tests, it is desired that the testing equipment produce a high voltage, high current short duration square wave pulse which may be both rapidly turned on and off. In other words, the produced pulse should have rapid rise and fall characteristics.

Generally, the difficulty with generating a high voltage, high current short duration square wave pulse lies in turning the pulse off. There are several devices such as gas thyratron tubes or silicon controlled rectifiers (SCR) that can turn a high current on very quickly but the current cannot be turned off with such rapidity due to the nature of the devices. A mechanical switch is far too slow to operate in the desired manner. In addition, mechanical switches normally produce electrical arcs when they are opened. Such performance would be detrimental in conducting tests as proposed in the environment in which the present invention is to be used. A thyratron tube is ineffective for the present purpose because it becomes ionized when turned on and the grid, therefore, no longer has control. Similarly, a semiconductor device becomes highly saturated when it turns on and cannot be quickly turned off.

It is normally the nature of electronic switching devices that high currents must be handled by creating a large number of free electrons by phenomena such as gas ionization or high semiconductor saturation in order to reduce resistive heating to a level that will not destroy the device. One of the present switches known to the prior art is a current control device in which an SCR is utilized as a gate controlled switch. Such a device has a turn on time of about one microsecond, but requires twenty to fifty microseconds to turn off.

Therefore, an object of this invention is the provision of an electronic transient generator which is designed to produce a high voltage, high current square wave pulse of excellent waveform.

Another object of this invention is the provision of an electronic transient generator which produces a square wave pulse waveform having substantially vertical rise and fall characteristics.

Still another object of this invention is the provision of a pulse circuit utilizing silicon controlled rectifiers in which square wave pulses are produced.

A further object of the invention is the provision of a pulse circuit which operates a power source across a load by turning on an SCR in series with the load and then after a selected time interval shuts the pulse off by short circuiting the pulse around the load with a shunt SCR whose turn on time is controlled by a delay device having an operating cycle time of less than the turn off time of the series SCR and equal to the desired pulse width.

Yet another object of the invention is the provision of an electronic transient generator which is effective in use for the purposes designed and is easily manufactured at relatively low cost.

Other objects, advantages and capabilities of the invention will become apparent from the following description taken in conjunction with the accompanying drawing showing only a preferred embodiment of the invention. It is understood, however, that the description is not to be taken in a limiting sense, the scope of the invention being defined in the appended claims.

In the drawing:

The FIGURE of the drawing shows a schematic representation of a preferred embodiment of the present transient generator.

Briefly stated, the present invention operates a power source, that maintains a charge upon a capacitor bank, across a load by turning on an SCR in series with the load to discharge the capacitor bank through the load and then, after a selected time interval, shuts the pulse off by short circuiting the pulse around the load with a shunt SCR. More specifically, after the closing of a gating switch the first SCR turns on the pulse and after a selected time interval the second SCR short circuits the pulse and then a third device, preferably a suitable delay relay, turns the current off. Thus, the load sees a pulse of substantially square waveform that turns on when the first SCR turns on and then turns off when the second SCR turns on.

Referring now to the drawing wherein like reference characters designate corresponding parts throughout the single FIGURE, the circuit of the present transient generator is generally indicated by the numeral 11. A suitable power supply 12 charges a large capacitor bank 13 through a current limiting resistor 14. The capacitor bank 13 is of known design and the only criterion for the present invention is that the capacitor bank 13 have sufficient capacity to store the desired charge necessary to operate the invention as to be later described. The current limiting resistor 14 limits the charging current from the power supply 12 to what the power supply can safely deliver to the capacitor bank 13. Alternatively, the current limiting resistor 14 may be a known type of constant current regulator. A current limiting resistor 15 interconnects the capacitor bank 13 with the remainder of the circuit and is included so that the circuit current will be limited to a value that will not damage any of the components.

A suitable switching relay 16, having a switch contact blade 16a, is positioned between the current limiting resistor 15 and the load 17. The load 17 is connected to the present circuit across output terminals A, B. A shunt SCR 18 is connected in the circuit so that upon proper operation of the circuit it short circuits the current from the capacitor bank 13 around the load 17. In series with the load 17 is an SCR 19 which, when gated on, supplies the voltage stored in the capacitor bank to the load 17. Once the capacitor bank 13 has been fully charged by the power supply 12, the normally open gating switch 21 is closed, which enables a suitable gating current supply to provide bias to gate electrode 19a to gate on the series SCR 19. As SCR 19 is gated on the voltage stored in the capacitor bank 13 is discharged through the load 17.

Obviously the gating switch 21 may be of any suitable type whether it be a simple push button switch or an automatic repetitive switching device. The type to be used would be solely determined by the application of the present invention. Also, upon the closing of switch 21, the delay device 22 is placed in operation and it should be noted that this delay device should be one which is designed for the application of the circuit. For example, the delay device may typically be a one shot multivibrator or even a delay line having suitable delay characteristics. The function of the delay device 22 is to give the desired pulse width to the pulse being applied to load 17 by controlling the operation of SCR 18 as will become more apparent in the description to follow.

As was indicated above, the delay device 22 gives the desired pulse width to the pulse being applied to the load 17. It is well known that the turn on time of an SCR from a non-conducting state to a conducting state is virtually instantaneous, but that the turn off time is inherently slow. Consequently, once SCR 18 is driven to the conducting state to shunt load 17, SCR 19 is not turned off due to its oversaturated condition and remains in a conductive shunted state. Therefore, it is incumbent for the delay device to be the controller for the width of pulse 25. That is, the delay device 22 has a time of operation in this circuit equal to the time of the width of the pulse 25 and it is anticipated that the delay device will have completed its cycle of operation before SCR 19 is rendered non-conductive.

In operation of the present invention it should be assumed that in the normal mode of operation gating switch 21 will be in the open position to prevent the low voltage gating current from being supplied to the gates of the SCR's until desired. As switch 21 is closed, the fully charged capacitor bank 13 is discharged. This discharge takes place since SCR 19 is gated on by the application of the gating current to gate electrode 19a as switch 21 is closed. The voltage stored in the capacitor bank 13 is then applied to the load 17 through the current limiting resistor 15. In order that the gate current of the SCR 19 is limited to a desired value, a limiting resistor 23 is placed in series between the gate electrode 19a of SCR 19 and switch 21. Should it be desired to speed up the operation of SCR 19, a suitable capacitance may be added in parallel with the limiting resistor 23 for that purpose. Closing of the switch 21 also energizes delay device 22 and, after the built-in delay of this device, a voltage is applied to the gate electrode 18*a* of SCR 18 thereby turning this SCR on. For SCR 18 there is also provided a current limiting resistor indicated by numeral 24 which also may have a parallel capacitance in circuit therewith to provide a faster turn on time for this SCR. When the delay device 22 gates on SCR 18, the current from the capacitor bank 13 through the load 17 is then short circuited around the load, thus quickly reducing the load voltage to a minimal value. At a predetermined time after SCR 18 conducts to shunt load 17, relay 16 opens and cuts off the current flow through SCR 18 so that this SCR can recover to its high resistance mode. The relay 16, as it opens, also causes SCR 19 to recover its high resistance mode which stops the possibility of any current flow through load 17. It should be noted that the delay device 22 has a cycle time, measured from the time switch 21 is closed until SCR 18 is gated on, of an amount less than the turn off time of the SCR 19. Consequently, the width of pulse 25 is determined by the delay characteristics of device 22.

As the switch 21 is closed, relay 16 is energized causing the interruption of the current flow through SCR 18 by the opening of switch contact blade 16*a*. If the desired pulse applied to the load is longer than the actuation in time of relay 16, a delay device may be included in the relay coil line to increase the actuation time of the relay. Of course the relay may be replaced with any other type of switch having adequate current interrupting capability. It should be apparent that the function of relay 16 is to allow SCR 18 and SCR 19 to return to their high resistance mode after the pulse is completed by stopping the current flow through SCR 18 and eliminating the oversaturation of SCR 19. When gating switch 21 is reopened, the cycle is complete. A typical waveform that is applied to the load 17 is indicated by the numeral 25.

From the above description it can be seen that the switching speed of SCR 19 determines the rise time of the pulse and the switching speed of SCR 18 determines the fall time of the pulse. Normally these times are identical in order to generate a rectangular or square pulse waveform. While the power supply 12 determines the pulse voltage, resistor 15 determines the internal impedance of the circuit and together the resistor 15 and capacitor bank 13 determine the flatness of the top of the pulse. The value of resistor 15 is preferably in the order of one ohm or less in order to provide a very low internal impedance for the circuit.

As seen from the above description of the novel circuit presented herein, the fast turn on time characteristic for an SCR is utilized to both supply a pulse to the load and also to stop the application of the pulse to the load so that a very square pulse waveform is generated to the load. By utilization of the SCR's in the manner proposed herein, the slow turn off characteristics of these devices are not a hinderance.

Various modifications may be made in the invention without departing from the spirit and scope thereof; and it is desired therefore that only such limitations shall be placed thereon as are imposed by the prior art and are set forth in the appended claims.

What is claimed is:

1. A pulse circuit comprising a pair of output terminals adapted to be connected to a load, a chargeable means connected to the output terminals, a voltage source to charge the chargeable means and being connected thereto, the voltage source having first and second terminals, switch means connected to the chargeable means to discharge said chargeable means at predetermined times through the load, the switch means including first and second silicon controlled rectifiers wherein the first silicon controlled rectifier is connected in series with the load, the second silicon controlled rectifier being connected in the circuit in shunt relationship to the first silicon controlled rectifier and the load, the switch means operable to shunt the discharge of the chargeable means through the second silicon controlled rectifier after a predetermined time interval thereby dropping the load voltage to substantially zero, the switch means further including a time delay device for gating the second silicon controlled rectifier to a conducting condition at said predetermined interval subsequent to the discharge of the chargeable means and prior to the return of the first silicon controlled rectifier to a non-conducting state.

2. A pulse circuit capable of generating a pulse of square waveform at substantial current levels and supplying the pulse to a load connected across first and second output terminals, a chargeable means connected to the output terminals, a voltage source to charge the chargeable means and connected thereto, the voltage source having first and second terminals, a gating switch being connected to a source of gating current, a first silicon controlled rectifier having anode, cathode and gate electrodes and having its anode electrode connected to the second output terminal and its cathode electrode connected to the second terminal of the voltage source to thereby place the first silicon controlled rectifier in series with the load, the gate electrode of the first silicon controlled rectifier being connected to the gating switch so that when the gating switch is closed said silicon controlled rectifier is gated on to cause the chargeable means to discharge through the load, selectively operable shunt means connected across both the load and the first silicon controlled rectifier, shunt control means operable to shunt the discharge of the chargeable means around the load at a predetermined time after the gating switch is closed thereby dropping the load voltage to substantially zero, the shunt control means having a time delay device whose operating cycle extends from the closing of the gating switch until the load is shunted, the operating cycle of the time delay device having a magnitude in the order of the time of the pulse width.

3. A pulse circuit capable of generating a pulse of square waveform at substantial current levels and supplying the pulse to a load according to claim 2, wherein the operating cycle of the time delay further being of a period less than the turn off time of the first silicon controlled rectifier.

4. A pulse circuit capable of generating a pulse of square waveform at substantial current levels and supplying the pulse to a load according to claim 3 wherein the shunt means comprises a second silicon controlled rectifier having anode, cathode and gate electrodes and having its anode electrode connected to the first output terminal and its cathode connected to the cathode of the first silicon controlled rectifier, the gate electrode of the second silicon controlled rectifier being connected to the gating switch.

5. A pulse circuit capable of generating a pulse of square waveform at substantial current levels and supplying the pulse to a load according to claim 4 wherein the shunt control means comprises a delay device in series between the gating switch and the gate electrode of the second silicon controlled rectifier to control the gating of said silicon controlled rectifier.

6. A pulse circuit capable of generating a pulse of square waveform at substantial current levels and supplying the pulse to a load connected across first and second output terminals, a chargeable means connected to the output terminals, a voltage source to charge the chargeable means and connected thereto, the voltage source having first and second terminals, a gating switch being connected to a source of gating current, a first silicon controlled rectifier having anode, cathode and gate electrodes and having its anode electrode connected to the second output terminal and its cathode electrode connected to the second terminal of the voltage source to thereby place the first silicon controlled rectifier in series with the load, the gate electrode of the first silicon controlled rectifier being connected to the gating switch so that when the gating switch is closed said silicon controlled rectifier is gated on to cause the chargeable means to discharge through the load, selectively operable shunt means connected across both the load and the first silicon controlled rectifier, shunt control means operable to shunt the discharge of the chargeable means around the load at a predetermined time after the gating switch is closed thereby dropping the load voltage to substantially zero, the shunt control means comprising a second silicon controlled rectifier having anode, cathode and gate electrodes and having its anode electrode connected to the first output terminal and its cathode connected to the cathode of the first silicon controlled rectifier, the gate electrode of the second silicon controlled rectifier being connected to the gating switch, the shunt control means further comprising a delay device in series between the gating switch and the gate electrode of the second silicon controlled rectifier to control the gating of said silicon controlled rectifier, a relay having a predetermined delay interval and operable in response to the closing of the gating switch being connected in series between the chargeable means and the load to prevent the discharge of the chargeable means subsequent to the delay interval of the relay.

* * * * *